Dec. 24, 1929.  T. NOLEN ET AL  1,740,779
DUMPING VEHICLE
Filed Oct. 12, 1925  3 Sheets-Sheet 1
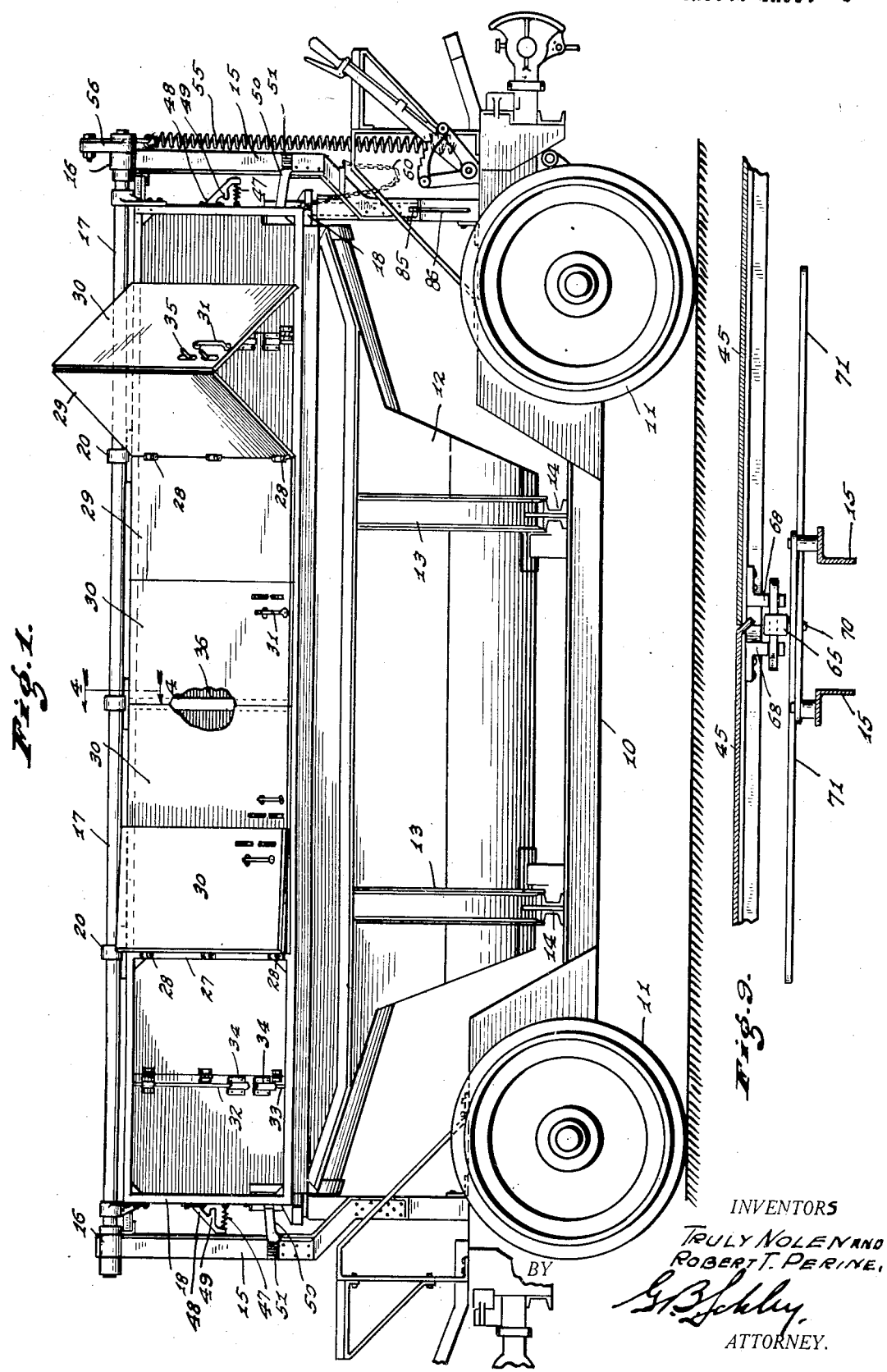
INVENTORS
TRULY NOLEN AND
ROBERT T. PERINE,
BY G. B. Schley.
ATTORNEY.

Dec. 24, 1929.　　　　T. NOLEN ET AL　　　　1,740,779
DUMPING VEHICLE
Filed Oct. 12, 1925　　　3 Sheets-Sheet 2
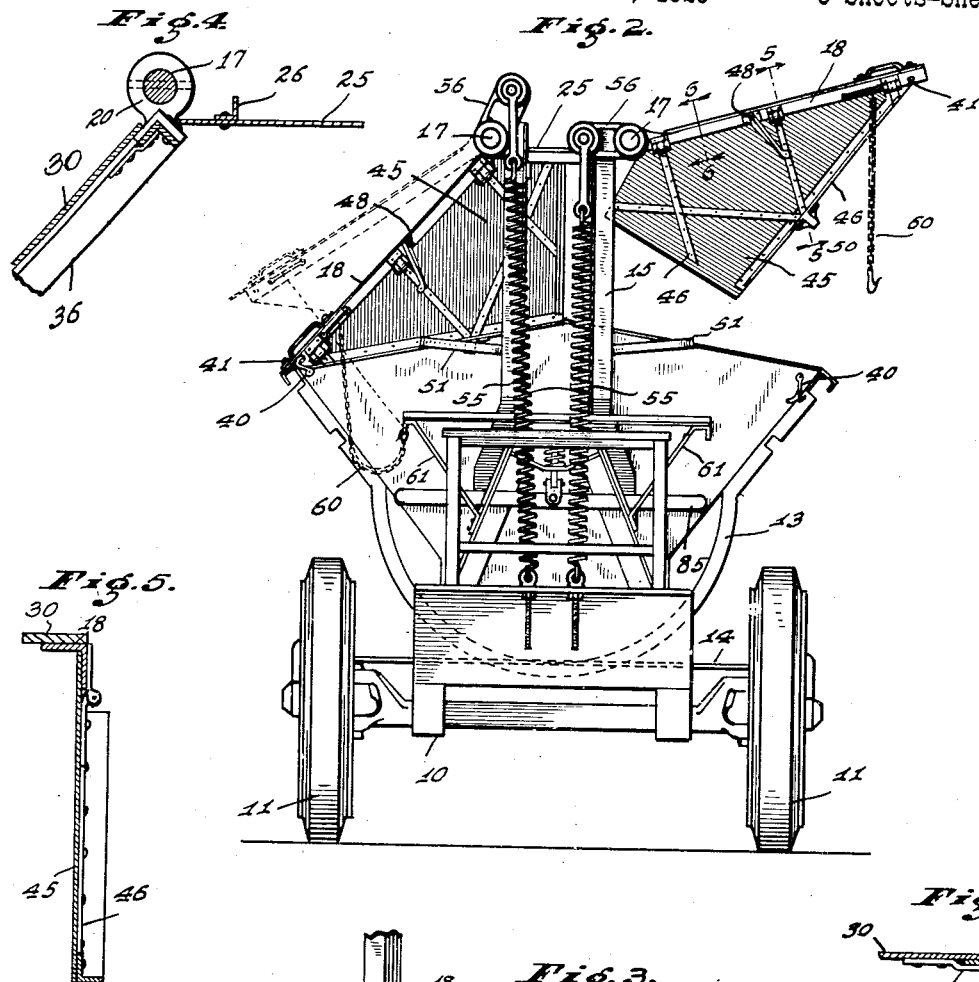
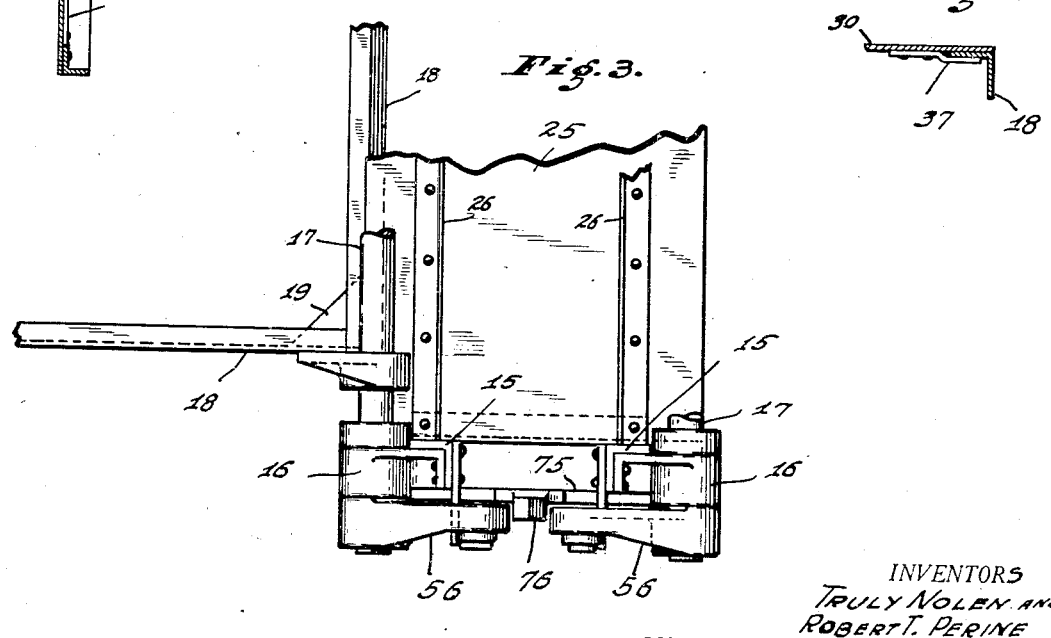
INVENTORS
TRULY NOLEN AND
ROBERT T. PERINE
BY
G. B. Schley.
ATTORNEY.

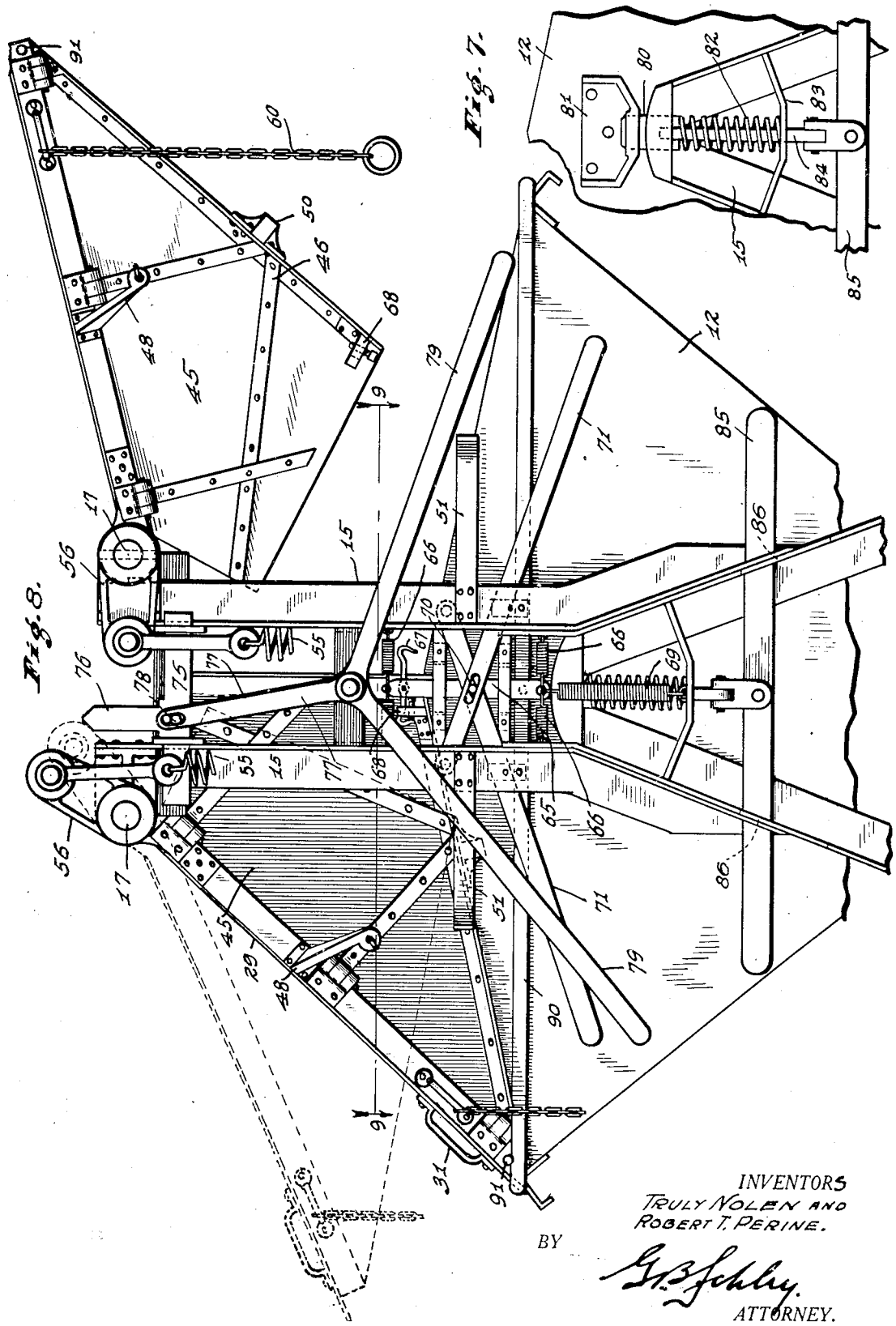

Patented Dec. 24, 1929

1,740,779

UNITED STATES PATENT OFFICE

TRULY NOLEN AND ROBERT T. PERINE, OF INDIANAPOLIS, INDIANA, ASSIGNORS, BY DIRECT AND MESNE ASSIGNMENTS, TO HIGHWAY TRAILER COMPANY, OF EDGERTON, WISCONSIN, A CORPORATION OF WISCONSIN

DUMPING VEHICLE

Application filed October 12, 1925. Serial No. 61,961.

It is the object of our invention to provide a cover for a side-dump vehicle or truck of a type adaptable for use in garbage and ash collection or for other similar purposes. More specifically, it is our object to provide a cover that will not interfere with the tilting of the usual dump-body but will substantially close the space above such body in order to exclude flies from the contents and to prevent spilling and the dissemination of unpleasant odors.

We accomplish the above objects by pivotally supporting from the chassis one or more pivoted frames which will overlie the dump-body and support sectional covers, and we desirably provide each pivoted frame on its ends with downwardly extending flaps adapted to rest against the end of the dump-body. In addition, we provide means for counterbalancing the weight of the pivoted frames and the parts they carry, and we also provide means for holding the frames in various positions of angular adjustment.

The accompanying drawings illustrate our invention: Fig. 1 is a side elevation of a dump vehicle equipped with our cover; Fig. 2 is an end elevation of the truck showing one of the cover-halves raised; Fig. 3 is a fragmental plan view of the cover; Fig. 4 is a section on the line 4—4 of Fig. 1; Fig. 5 is a section on the line 5—5 of Fig. 2; Fig. 6 is a fragmental section on the line 6—6 of Fig. 2; Fig. 7 is an end elevation illustrating the lock which holds the truck body in upright position; Fig. 8 is an end elevation of an enlarged scale showing a modification of the construction illustrated in Figs. 1 and 2; and Fig. 9 is a section on the line 9—9 of Fig. 8.

Our device is shown and described as applied to a truck, but it will be evident that it is equally applicable to a truck or other vehicle. Vehicles of the type to which our cover may be applied commonly have a main frame or chassis 10 supported on suitable wheels 11. The body 12 is provided with rockers 13 adapted to roll upon cross members 14 of the chassis in order to permit the tilting and dumping of the body 12. Our invention is not concerned primarily with the construction of the chassis or body.

In order to avoid interference with the tilting of the body 12, we support our cover from the chassis 10 by suitable uprights 15 mounted on opposite ends of the chassis and extending upward above the top of the body 12. Rotatably mounted in bearings 16 attached to the top of the supports 15 are two longitudinally extending shafts 17 to each of which is rigidly attached one or more open frames 18. Each of the frames 18 is conveniently rectangular in form and extends downward and outward from its supporting shaft to overlie the body. Each frame 18 may conveniently be formed of angle-iron and T-iron and provided at the corners with suitable gusset plates 19. Each frame 18 is supported from one of the shafts 17 by means of brackets 20 which are rigidly secured to the shaft and to the frame.

Extending between the uprights 15 and conveniently attached thereto is a plate 25 which closes the opening between the inner edges of the two frames 18. If desirable the plate 25 may be supported and reinforced by one or more longitudinally extending angle-irons 26.

Each of the frames 18 is provided with a a cover which is openable, desirably in sections, to permit filling the truck body without the necessity of uncovering it entirely. The cover illustrated in the drawings is formed of a plurality of plates hinged together, some of such plates being hinged to the frame 18. For this purpose, the frame 18 is provided with cross-members 27 which support hinges 28 to which are attached oppositely extending plates 29. At its outer edge, each plate 29 is pivotally connected to another plate 30. By this construction, any pair of plates 29—30 can be folded back to uncover an opening through the frame 18, while the remainder of the frame 18 is covered. If desired, each of the plates 30 may be provided with a handle 31 and with bolts 32 and 33 slidably mounted in suitable bearings 34 and provided with operating fingers 35 which extend outward through slots in the plate 30. When the cover is closed, the bolts 22 and 33 may be moved outward to engage the under side of the frame 18 in order to hold the cover firmly closed, at the center of each pair of plates.

At points where two plates 30 abut when closed, as at the longitudinal center of the frame 18 shown in the drawings, the frame 18 may be provided with a cross member 36 to form a sill for the two plates 30 whose edges rest upon it. Each of the plates 30 is desirably provided with fingers 37 on its under side in position to engage the frame 18 or the sill 36 when the cover is closed. To maintain the frame in its lower position, hooks 40 are mounted on the corners of the body 12 in such a position that they may engage pins 41 when the frame 18 is lowered onto the body.

To close the openings between the frames 18 and the body at the ends of the body, each frame 18 has pivotally attached to its opposite ends depending flaps 45 which may conveniently be formed of sheet metal provided with suitable reinforcing members 46. Each of the flaps 45 is spring-pressed outward by a tension spring 47 which acts between such flap and an arm 48 rigidly mounted on the frame 18. The arm 48 is provided with a stop or abutment 49 to limit the outward swinging of the flap under the force exerted by the spring 47. To hold each flap 45 securely against the end of the body when the frames 18 are lowered, each flap is provided with an outwardly extending arm 50 in position to co-operate with curved spring steel camming guides 51 which are mounted on the support 15. As either frame 18 is lowered, the projecting arms 50 on their associated flaps 45 engage the guides 51 which force the flaps against the ends of the dump body in opposition to the springs 47.

To facilitate raising of the frames 18 and the parts carried thereby, the frames are provided with counterbalances in the form of springs 55 each of which extends between a convenient point on the chassis 10 and an arm 56 rigidly mounted on each of the shafts 17. The arms 56 are so angularly disposed on their respective shafts relative to the frames 18, and the springs 55 are so tensioned, that the force exerted by the springs is insufficient to raise the frames 18 and their associated parts when the frames are in their lower positions. In this lower position of each frame 18, as is clear from the left-hand half of Fig. 2, the associated spring 55 is desirably adjusted to counter-balance a large portion but not quite all of the weight of the frame 18 and its associated parts. Owing to the angular position of the arms 56, the moment-arm of the force exerted by the spring 55 increases as the frame 18 is raised, and after the frame has been raised a short distance, its weight is overbalanced by the spring 55 and the frame is carried upward to the position shown at the right in Figs. 2 and 8.

It is desirable, for the purpose of washing the under side of the cover, to be able to hold either cover-half in partially raised position. For this purpose, a chain 60 may be secured to each frame 18 at one end and near the outer edge thereof. The other end of each of such chains is detachably secured to any convenient part of the chassis, preferably to lateral extensions 61 of the uprights 15. When the cover is closed, these chains hang slack as shown at the left in Fig. 2, but when the cover-half is raised to the dotted line position shown in Fig. 2, which is the position convenient for washing the cover, the chain prevents further upward movement of the cover-half which would result from the force exerted by the spring 55. When the lower end of the chain 60 is disengaged from the lateral extension 61, the spring 55 raises the cover completely to the position shown at the right in Figs. 2 and 8. With the cover in this position, the chains 60 hang downward and serve as a convenient means for lowering the cover.

In the modification of our invention illustrated in Fig. 8, the hooks 40 which hold the cover closed are dispensed with and means other than the chains 60 are employed for holding either cover-half in partially raised position.

As a substitute for the hooks 40 we mount intermediate the uprights 15 a member 65 which may conveniently be supported by springs 66 which extend between it and the upright. To the upper end of this member 65 are rigidly attached two oppositely extending hooks 67 which are in position to engage fingers 68 projecting outwardly from the flaps 45. When the frames 18 are lowered, the hooks 67 are held in firm engagement with the fingers 68 by a tension spring 69 which exerts a downward pull on the member 65. At a point intermediate its length, the member 65 is provided with a laterally extending pin 70 which is received in slots in two levers 71 which are pivotally mounted on the upright 15 and extend outwardly on opposite sides of said upright, so that this locking device may be operated from either side of the vehicle. By raising either of the levers 71, the hooks 67 are disengaged from the fingers 68, and the cover-halves can then be raised.

Instead of employing chains to hold the cover-halves in partially raised position, we may employ the means illustrated in Fig. 8. This means consists of a member 75 mounted so as to be slidable transversely near the upper end of one of the uprights 15. The member 75 is provided with an upwardly extending abutment 76 which may be moved into position to engage either of the arms 56 to which the springs 55 are attached. To move the member 75, a three-armed lever may be mounted on the upright 15. This three-armed lever has an upwardly extending arm 77 provided in its upper end with a slot for receiving a pin 78 on the transversely slidable member 75. The other two arms 79 of the three-armed lever are operating arms and extend outwardly in opposite directions from the upright 15 in order that the abutment 76 may be operated from either side of the vehicle. When the abutment is in its middle position, it permits both cover-halves to be raised to their uppermost position, while if the abutment is moved to engage one of the arms 56, it limits the upward movement of one of the cover-halves, as shown in the dotted lines in Fig. 8.

The tiltable body may be maintained in upright position, by any suitable means. As shown, a slidable locking bolt 80 may be mounted in the upright 15 in position to engage a hole or notch in the bracket 81 attached to the body 12. The bolt 80 may be spring-pressed upward to engage the bracket 81 by means of a spring 82 acting between the bolt and a cross bar 83 on the upright 15. To withdraw the bolt 80 from engagement with the bracket 81, the bolt is connected by a member 84 with the mid-point of a lever 85 which extends through slots 86 in the two legs of the upright 15. When either end of the lever 85 is depressed, the bolt 80 is withdrawn from engagement with the bracket 81 to permit the tilting of the body 12.

In Fig. 8 we have shown our vehicle as provided with means for raising either cover-half from the opposite side of the vehicle. This means consists of a lever 90 which is pivotally mounted on the upright 15 and extends transversely of the vehicle. A pin 91 is provided on each cover-half in position to be engaged by the lever 90. With this construction, when one end of the lever 90 is depressed the other end is raised and engages its associated pin 91 to lift the cover-half, to a height at and above which the force exerted by its associated spring 55 will be sufficient to overbalance the weight of the cover-half.

When our improved truck is being used, as for the collection of garbage or ashes, it is covered completely except for those openings through which the garbage or ashes are dumped into the body. As the garbage or ashes pile up beneath one of the openings in the cover, this opening may be closed by its associated pair of folding plates 29—30 and another opening may be uncovered. By this means, the contents of the body are almost completely covered, spilling prevented, and flies excluded to a large extent. A clean outer surface is also maintained on the covers by reason of their double hinged constructions.

When it is desired to wash the cover, one cover-half is raised to its intermediate position as shown by the dotted line in Figs. 2 and 8 and the other cover-half is raised completely as shown in the right-hand half of each of Figs. 2 and 8. With the cover-halves so positioned, they may readily be cleaned by directing a stream of water against the lower side of the completely and partially raised cover-halves.

We claim as our invention:

1. In an upwardly open dump body vehicle, a cover therefor including a pair of open frames pivotally supported above the body on axes extending parallel to and adjacent the longitudinal center of the vehicle, each frame being provided with a plurality of cover portions for closing the same, said cover portions being hinged together in pairs and arranged on said frame to permit any pair of covers to be folded upon themselves to provide an opening in the frame, and counter-balancing mechanism adjacent the end of the body, connected to the frames, adapted to continue to raise said frames after they have been raised to a predetermined point whereby to permit clearance of the body during discharge operations.

2. In an upwardly open dump body vehicle, a cover therefor including a pair of open frames pivotally supported above the body on axes extending parallel to and adjacent the longitudinal center of the vehicle, each frame being provided with a plurality of cover portions for closing the same, said cover portions being hinged together in pairs and arranged on said frame to permit any pair of covers to be folded upon themselves to provide an opening in the frame, and means adjacent the ends of the body, engaging the frames and tending to raise the same after they have been raised to a predetermined height, and means connected to said frames adapted to operate to hold the frame at a predetermined elevated position after said first means has commenced to raise the frames.

3. In an upwardly open dump body vehicle, upright frames adjacent the ends of said body, a pair of parallel shafts mounted in said uprights, each shaft provided with a cover extending over a portion of said body, said covers being adapted for independent raising to permit the body to dump, each of the covers comprising an open frame, and a plurality of sections hingedly connected forming a closure for the frame, a plurality of said sections being foldable upon each other independently of the other sections to provide an opening in the cover, and flaps depending from the end of said frames adapted to form a closure for the ends intermediate said covers and the vehicle body.

4. In the combination set forth in claim 3, said flaps being hingedly connected to the frames, for swinging laterally independently of each other and the cover as a whole.

5. In the combination set forth in claim 3. said flaps being hinged to the frames and movable independently thereof, spring means tending to force said flaps outwardly and guides carried on said uprights adapted to align said flaps with the body when the cover is lowered.

6. In an upwardly open dump body vehicle, upright frames adjacent each end of the body, a pair of shafts mounted in said uprights and extending longitudinally over the load-carrying space of said body, covers secured to said shafts adapted to enclose opposite portions of the body respectively and adapted to be swung upwardly over said body to permit the same to be tilted laterally, depending flaps hingedly connected to the ends of the covers adapted to enclose the portion intermediate said covers and the body, and means actuated when the covers are lowered to body closing position for moving said flaps against the ends of said body.

7. In an upwardly open dump body vehicle, upright frames adjacent each end of the body, a pair of shafts extending longitudinally over the load-carrying space of the body, covers secured to said shafts for enclosing opposite portions of the body and adapted to be swung upwardly over said body to permit the same to be tilted laterally, and the ends of each of said covers being provided with a hingedly connected depending flap adapted for enclosing the portions intermediate said covers and the body.

8. In combination with an upwardly open tiltable body, a support extending over the body transversely of the direction of its tilting movement with means on which the support is carried independently of the body, and a cover hinged to the support for swinging about the same and dimensioned to extend slopingly therefrom to meet one wall of the body, said cover comprising a skeleton frame and cover sections, each extending substantially from the hinged edge of the frame to the said wall of the body, said sections being hinged to said frame along axes perpendicular to the direction of extent of the support, whereby the sections may be individually opened to expose a selected portion of the load-carrying space of the body, or the entire cover may be swung upwardly about said support to permit the tilting movement of the body; said hinged cover sections each comprising two plates of similar area hingedly connected for folding their under sides together and hinged to the frame for swinging upwardly therefrom and over flatly onto an adjacent cover section.

In witness whereof, we have hereunto set our hands at Indianapolis, Indiana, this 10th day of October, A. D. one thousand nine hundred and twenty-five.

TRULY NOLEN.
ROBT. T. PERINE.